(12) United States Patent
Brandt et al.

(10) Patent No.: US 8,472,414 B2
(45) Date of Patent: Jun. 25, 2013

(54) SHARING A FREQUENCY BAND BETWEEN DIFFERENT RADIO COMMUNICATIONS PROTOCOLS

(75) Inventors: Seemal Naphade Brandt, Farnborough (GB); Kanji Kerai, London (GB); Natividade Albert Lobo, Windsor (GB)

(73) Assignee: Nokia Corporation, Espoo (FI)

( * ) Notice: Subject to any disclaimer, the term of this patent is extended or adjusted under 35 U.S.C. 154(b) by 316 days.

(21) Appl. No.: 12/812,273

(22) PCT Filed: Jan. 11, 2008

(86) PCT No.: PCT/EP2008/000178
§ 371 (c)(1),
(2), (4) Date: Aug. 19, 2010

(87) PCT Pub. No.: WO2009/086851
PCT Pub. Date: Jul. 16, 2009

(65) Prior Publication Data
US 2010/0316025 A1     Dec. 16, 2010

(51) Int. Cl.
*H04J 3/00* (2006.01)

(52) U.S. Cl.
USPC .................... 370/336; 370/345; 370/478

(58) Field of Classification Search
None
See application file for complete search history.

(56) References Cited

U.S. PATENT DOCUMENTS

| 2003/0016770 A1* | 1/2003 | Trans et al. ............... 375/346 |
| 2005/0207482 A1* | 9/2005 | Redfern .................... 375/222 |
| 2006/0194538 A1 | 8/2006 | Palin et al. ............... 455/41.2 |
| 2006/0292986 A1* | 12/2006 | Bitran et al. ............. 455/41.2 |
| 2008/0240048 A1* | 10/2008 | Okker et al. ............. 370/338 |
| 2010/0172254 A1* | 7/2010 | Sachs ...................... 370/252 |

FOREIGN PATENT DOCUMENTS

| EP | 1 729 463 A1 | 12/2006 |
| WO | WO 2006/090242 A1 | 8/2006 |
| WO | WO 2007/138377 A1 | 12/2007 |

OTHER PUBLICATIONS

"Core System Package (Controller volume) part B, Baseband specification, Bluetooth Specification Version 2.0 + EDR (vol. 3)", Baseband Specification, Bitstream Processing, Nov. 4, 2004, 98 pgs.
"Part 11: Wireless LAN Medium Access Control (MAC) and Physical Layer (PHY) specifications, Amendment 4L Further Higher Data Rate Extension in the 2.4 GHz Band", IEEE Std. 802.11g-2003, Jun. 27, 2003, 67 pgs.
"Part 11: Wireless LAN Medium Access Control (MAC) and Physical Layer (PHY) specifications, Amendment 4L Further Higher Data Rate Extension in the 2.4 GHz Band", IEEE Std. 802.11b-1999, Sep. 16, 1999, 89 pgs.

* cited by examiner

*Primary Examiner* — Jianye Wu
(74) *Attorney, Agent, or Firm* — Harrington & Smith (57) ABSTRACT

A method including enabling a first mode of a first radio communications protocol using a shared radio frequency band and having a first defined schedule for communication in the shared radio frequency band; enabling a second mode of a second radio communications protocol using the shared radio frequency band and having a second defined schedule for communication in the shared radio frequency band; and enabling the first mode and disabling the second mode at a conflict time at which the first defined schedule and the second defined schedule coincide.

21 Claims, 6 Drawing Sheets

FIG.8

SHARING A FREQUENCY BAND BETWEEN DIFFERENT RADIO COMMUNICATIONS PROTOCOLS

FIELD OF THE INVENTION

Embodiments of the present invention relate to sharing a common frequency band between different radio communications protocols.

BACKGROUND TO THE INVENTION

Bluetooth and WLAN share in common the 2.4 GHz ISM frequency band. When WLAN radio transmissions and Bluetooth radio transmissions overlap they can interfere with each other.

One solution to this problem has been adaptive frequency hopping (AFH) in Bluetooth. The Bluetooth transceivers do not use certain frequencies where there is interference because, for example, it is used by a WLAN transceiver. However, AFH requires frequency scanning which is not always practical and uses up radio resources.

BRIEF DESCRIPTION OF VARIOUS EMBODIMENTS OF THE INVENTION

According to various embodiments of the invention there is provided a method comprising: enabling a first mode of a first radio communications protocol using a shared radio frequency band and having a first defined schedule for communication in the shared radio frequency band; enabling a second mode of a second radio communications protocol using the shared radio frequency band and having a second defined schedule for communication in the shared radio frequency band; and enabling the first mode and disabling the second mode at a conflict time at which the first defined schedule and the second defined schedule coincide.

According to various embodiments of the invention there is provided an apparatus comprising: a first radio transceiver configured to operate according to a first radio communications protocol that uses a shared radio frequency band; a second radio transceiver configured to operate according to a second different radio communications protocol that uses the shared radio frequency band; and a controller configured to enable radio communications by the first radio transceiver and temporarily disable radio communications by the second transceiver to avoid simultaneous radio communications by the first radio transceiver, when using a first defined schedule for communication in the shared radio frequency band, and the second radio transceiver, when using a second defined schedule for communication in the shared radio frequency band.

According to various embodiments of the invention there is provided a module comprising: a first radio transceiver configured to operate according to a first radio communications protocol that uses a shared radio frequency band, an interface for interconnection to a second radio transceiver configured to operate according to a second different radio communications protocol that uses the shared radio frequency band; and a controller configured to enable a scheduled communication according to the first radio communications protocol while disabling a scheduled simultaneous communication according to the second radio communications protocol.

According to various embodiments of the invention there is provided a computer program comprising: a first set of instructions for performing a first algorithm for dynamically and variably allocating a radio communications channel to one of a communication according to a first radio communications protocol and a simultaneous communication according to a second radio communications protocol; an input interface for receiving a first input that identifies scheduling for the first radio communications protocol and a second input that identifies scheduling for the second radio communications protocol; a second set of instructions for performing a second algorithm for allocating a radio communications channel to a scheduled communication according to the first radio communications protocol in preference to a scheduled simultaneous communication according to the second radio communications protocol.

According to various embodiments of the invention there is provided an apparatus comprising: means for communicating according to a first protocol in a shared radio frequency band; means for communicating according to a second protocol in the shared radio frequency band; means for enabling a scheduled communication according to the first protocol while disabling a scheduled simultaneous communication according to the second protocol and thereby avoiding simultaneous scheduled communications in the shared radio frequency band.

According to various embodiments of the invention there is provided a method comprising: enabling VoIP communication over WLAN using the 2.4 GHz ISM band; enabling synchronous data communication over Bluetooth using the 2.4 GHz ISM band; enabling VoIP communication over WLAN and temporarily disabling synchronous data communication over Bluetooth to avoid simultaneous VoIP communication over WLAN and synchronous data communication over Bluetooth.

According to various embodiments of the invention there is provided a method comprising: enabling at an apparatus a synchronous mode of a radio communications protocol using a frequency hopping sequence determined by a native clock of a Master for slots reserved for periodic synchronous communication; simultaneously enabling at the apparatus a scanning mode of the radio communications protocol using a frequency hopping sequence determined by a native clock of the apparatus for slots other than the slots reserved for periodic synchronous communication.

According to various embodiments of the invention there is provided an apparatus comprising: a radio transceiver for communicating in an ad-hoc network in accordance with a radio communications protocol; and a controller configured to reserve slots for periodic synchronous communication and to control the radio transceiver to use a frequency hopping sequence, determined by a native clock of a Master of the ad-hoc network, for the reserved slots and configured to enable scanning using a frequency hopping sequence determined by a native clock of the apparatus for slots other than the reserved slots.

According to various embodiments of the invention there is provided a method comprising: enabling at an apparatus a synchronous mode of a radio communications protocol using a frequency hopping sequence determined by a native clock of a Master for slots reserved for periodic synchronous communication; transmitting a synchronous packet in a reserved slot, wherein the synchronous packet comprises data and an error detection code.

According to various embodiments of the invention there is provided a method comprising: enabling at an apparatus a synchronous mode of a radio communications protocol using a frequency hopping sequence determined by a native clock of a Master for slots reserved for periodic synchronous communication; receiving a synchronous packet in a reserved slot, wherein the synchronous packet comprises data and an error detection code.

According to various embodiments of the invention there is provided a method comprising: detecting when a first telephony mode of a first wireless infrastructure network and a second synchronous mode of a second wireless ad-hoc network that share a common frequency band are simultaneously active; in response to said detection, controlling circuitry that arbitrates which of the first wireless infrastructure network or the second wireless ad-hoc network access the common frequency band, to grant access to the first wireless infrastructure network whenever scheduled communications of the first telephony mode and scheduled communications of the synchronous mode overlap.

BRIEF DESCRIPTION OF THE DRAWINGS

For a better understanding of various embodiments of the present invention reference will now be made by way of example only to the accompanying drawings in which.

DETAILED DESCRIPTION OF VARIOUS EMBODIMENTS OF THE INVENTION

Figure 1:
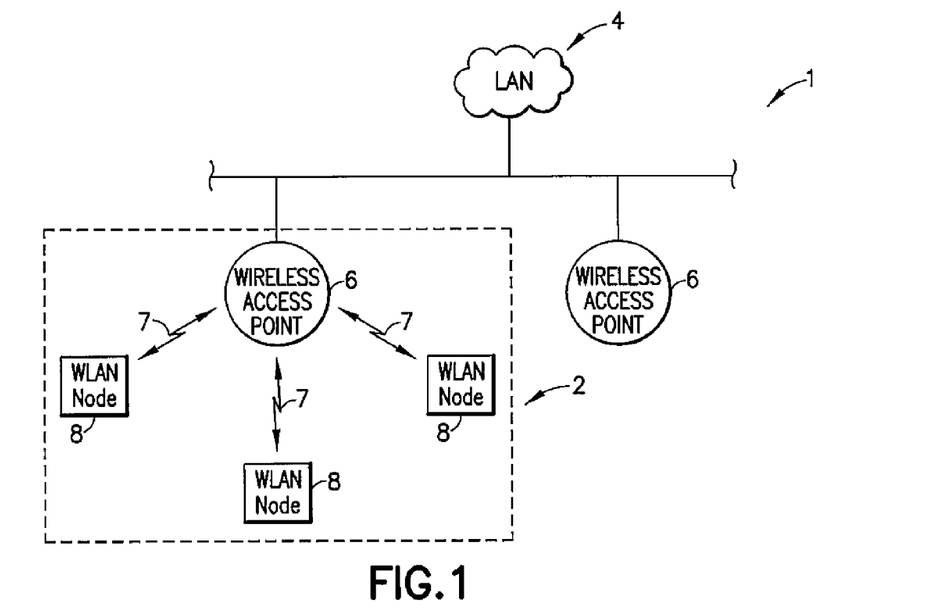
FIG. 1 schematically illustrates a wireless local area network (WLAN) in a network configuration.

FIG. 1 schematically illustrates a wireless local area network (WLAN) 2 in a network configuration 1. The network configuration 1 comprises a wired local area network (LAN) 4 including a plurality of wireless access points 6, each of which supports its own WLAN 2.

A WLAN 2 comprises a plurality of WLAN nodes 8 which communicate directly with the wireless access point 6. Synchronization of the wireless nodes 8 to a common time reference is achieved by the wireless access point 6 periodically (every 100 ms) transmitting a beacon for reception by the wireless nodes 8.

A wireless access point 6 and a wireless node 8 communicate by transmitting WLAN packets 7 which typically include a source address and a destination address. The packets are sent wirelessly in the 2.4 GHz ISM frequency band in the IEEE 802.11b and 802.11g specifications.

The WLAN 2 may be used for packet-switched telephony using, for example, voice over Internet Protocol (VoIP). In VoIP data packets at sent at regular intervals—10 ms, 20 ms, 30 ms or 100 (idle) ms. The length of a VoIP data packet depends upon data rate used in the WLAN 2 and the number of simultaneously active wireless nodes 8. The VoIP data packet is small for a high data rate (e.g. 11 Mbps) and one wireless node 8 and is large for a low data rate (e.g. 1 Mbps) and a larger number of active wireless nodes 8.

Figure 2:
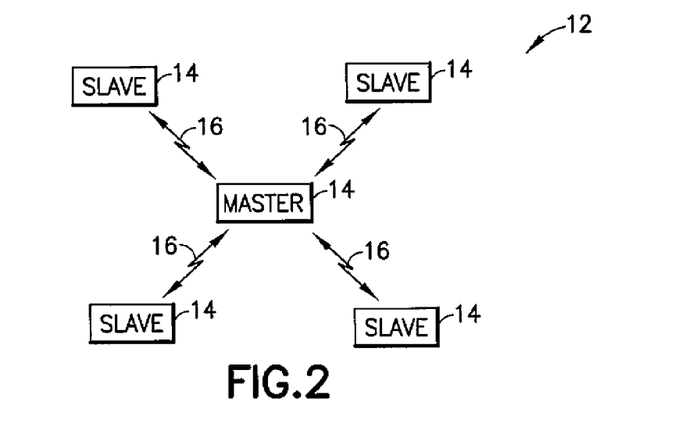
FIG. 2 schematically illustrates a Bluetooth ad-hoc network.
Figure 3:
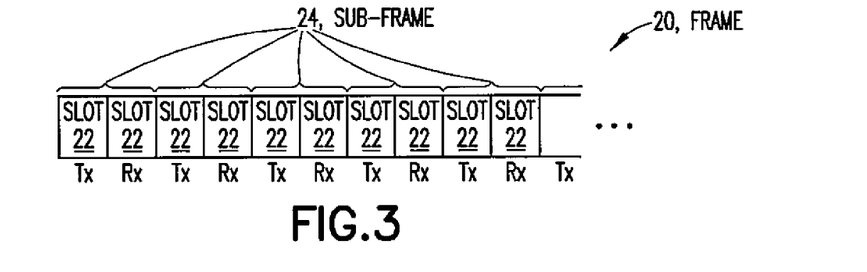
FIG. 3 schematically illustrates a frame of the Bluetooth network.

FIG. 2 schematically illustrates a Bluetooth ad-hoc network 12. The network 12 comprises a plurality of low power radio frequency transceiver devices 14. One of the transceiver devices (M) operates as a Master and its native clock defines the time reference and frequency hopping sequence for the network 12. The remaining transceivers (S) operate as Slaves. The network time reference is used to define a frame 20 of time division duplex (TDD) frames 24 each of which includes two slots 22 as illustrated in FIG. 3.

The slots 22 in the frame 20 are sequentially numbered. The Slave transceiver devices 14 communicate by transmitting/receiving packets 16 to/from the Master transceiver device only. The Master transceiver is configured to start transmitting a packet, addressed to a particular Slave, at the start of an odd slot. A Slave is configured to be able to start transmitting a packet at the start of the next even slot.

In an asynchronous mode a Slave transmits a packet in an even numbered slot if it has received a packet addressed to it from the Master in the preceding neighboring odd slot. The network frequency hopping sequence is used.

In a synchronous mode, neighboring slots may be reserved for transmitting a packet from the Master to a particular Slave and for transmitting a packet from that Slave to the Master. The network frequency hopping sequence is used.

Examples of the synchronous mode in Bluetooth include the synchronous connection oriented (SCO) logical transport mode and the extended synchronous connection oriented (eSCO) logical transport mode.

When the synchronous mode is used to communicate audio data between Master and Slave then a reserved TDD frame is used periodically every three TDD frames for audio data packets. The other two unreserved TDD frames are available for other connections. The interval between the start of successive TDD frames used for audio data packets is 3.75 ms (6 slots).

A transceiver device 14 will also support one or more scanning modes. In a scanning mode, the transceiver device 14 scans outside the network 12. It uses a frequency hopping sequence based upon its own native clock rather than the native clock of the Master of the network 12.

Figure 4:
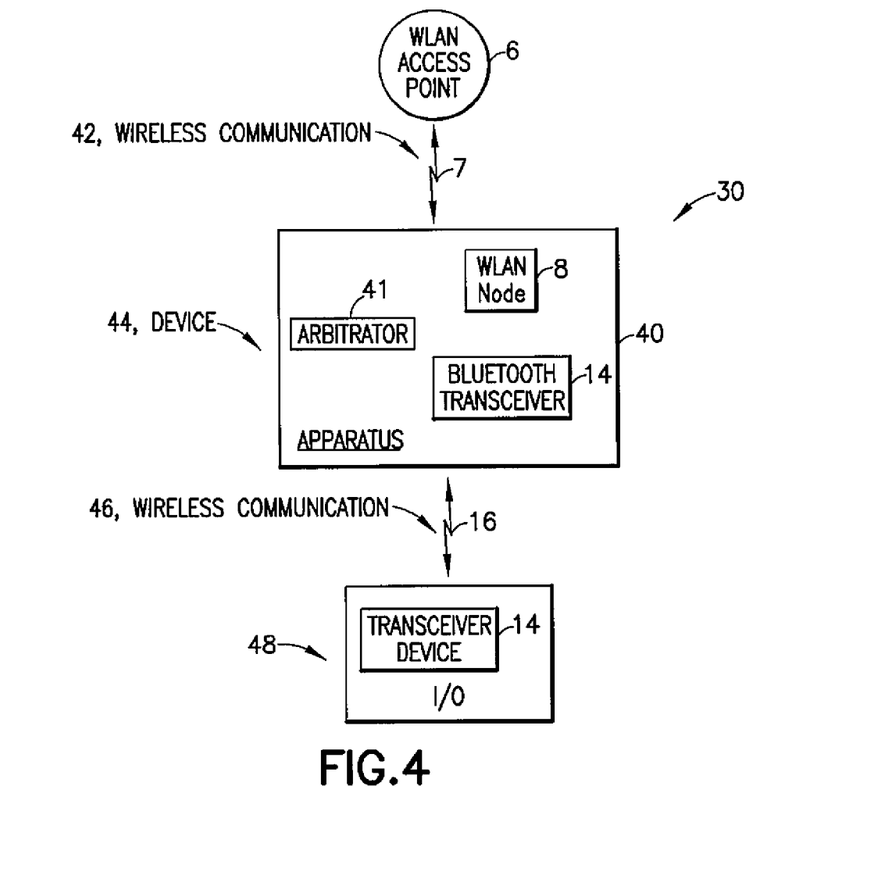
FIG. 4 schematically illustrates a communication system in which an apparatus operates as a dual mode device.

FIG. 4 schematically illustrates a communication system 30 in which an apparatus 40 operates as a dual mode device. The apparatus 40 comprises a WLAN node 8 and also a Bluetooth transceiver device 14. The apparatus 40 may be a hand-portable electronic device 44.

The apparatus 40 may be a host device which includes a first chipset, which may include firmware, that provides the functionality of the WLAN node 8 and a second chipset, which may include firmware that provides the functionality of the Bluetooth transceiver device 14.

When simultaneously active in the same product the WLAN node 8 and the Bluetooth transceiver device 14 act as noise sources for one another. When the WLAN node 8 and the Bluetooth transceiver device 14 simultaneously want access to the ISM frequency band, an arbitrator 41 is used to arbitrate which of the WLAN node 8 and the Bluetooth transceiver device 14 will have access to the ISM band.

The WLAN node wirelessly communicates 42 with the WLAN access point 6 and the Bluetooth transceiver device 14 wirelessly communicates 46 with another wireless transceiver device 14 which may be housed in a user input/output device such as a wireless headset.

Figure 5A:
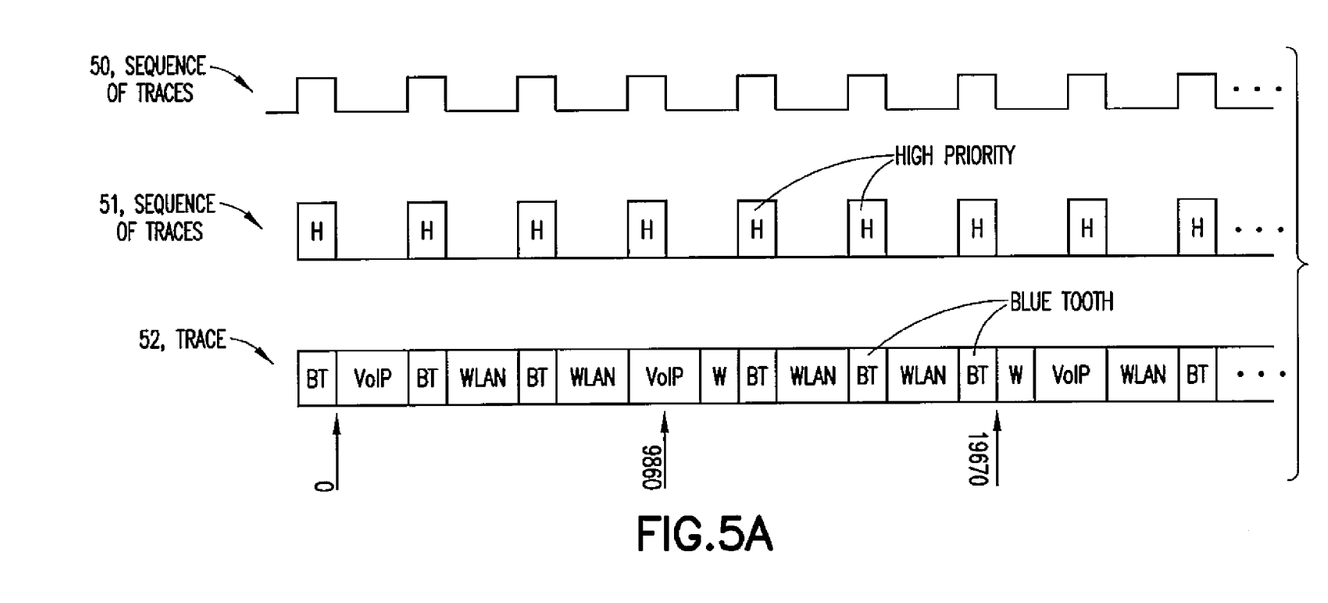
FIGS. 5A and 5B illustrate the operation of an arbitrator.
Figure 5B:
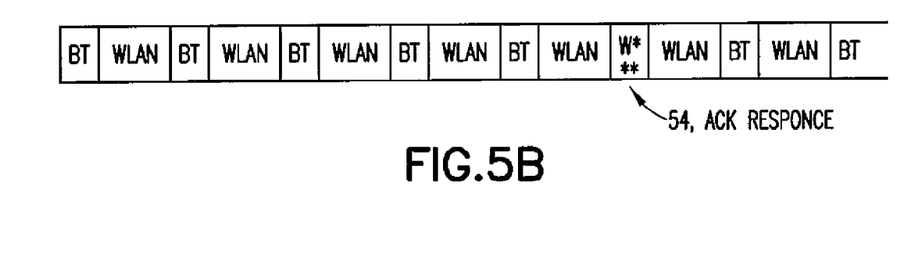

FIGS. 5A and 5B illustrate the operation of the arbitrator 41. The traces 50, 51 illustrate requests sent by the Bluetooth transceiver device 14 to the arbitrator 41 to request access to the ISM band during a synchronous mode of the Bluetooth communications protocol such as SCO or eSCO. It can be seen that the traces 50, 51 periodically request access to the ISM band with a high (H) priority.

In a first, 'normal' mode of operation the arbitrator 41 uses a first algorithm to determine conflicting requests for access to the ISM band from the Bluetooth transceiver device 14 and the wireless node 8 and allocates access to one or the other depending upon context. For example, as illustrated in FIG. 5B, the arbitrator may preferentially give access to the high priority Bluetooth synchronous mode over the WLAN except where the WLAN node 8 sends an ACK response 54.

When the WLAN node 8 enters a specified first mode (e.g. a VoIP communications mode) and the Bluetooth transceiver device enters a specified second mode (e.g. a synchronous communications mode), then the arbitrator 41 uses a second algorithm to determine conflicting requests for access to the ISM band from the Bluetooth transceiver device 14 and the wireless node 8 and preferentially allocates access to the WLAN node as illustrated in FIG. 5B.

The first mode and the second mode are time-critical data communication modes in which real-time audio data is transferred. The first VoIP mode uses periodically transmitted packets 7 and the second synchronous mode also uses periodically transmitted packets 16, however, the periods have different intervals so will sometimes overlap. The arbitrator 41 resolves the conflict when overlap occurs by granting access to the WLAN node 8.

In FIG. 5A, the VoIP packets 7 are sent in preference to the synchronous data packets 16. The arbitrator 41 may also preferentially give access to the ISM band to the WLAN node 8 whenever a beacon is to be received so that proper synchronization is maintained.

The second algorithm therefore preferentially maintains the voice telephony (VoIP) communication 42 in preference to the Bluetooth synchronous data communication 46.

Figure 6:
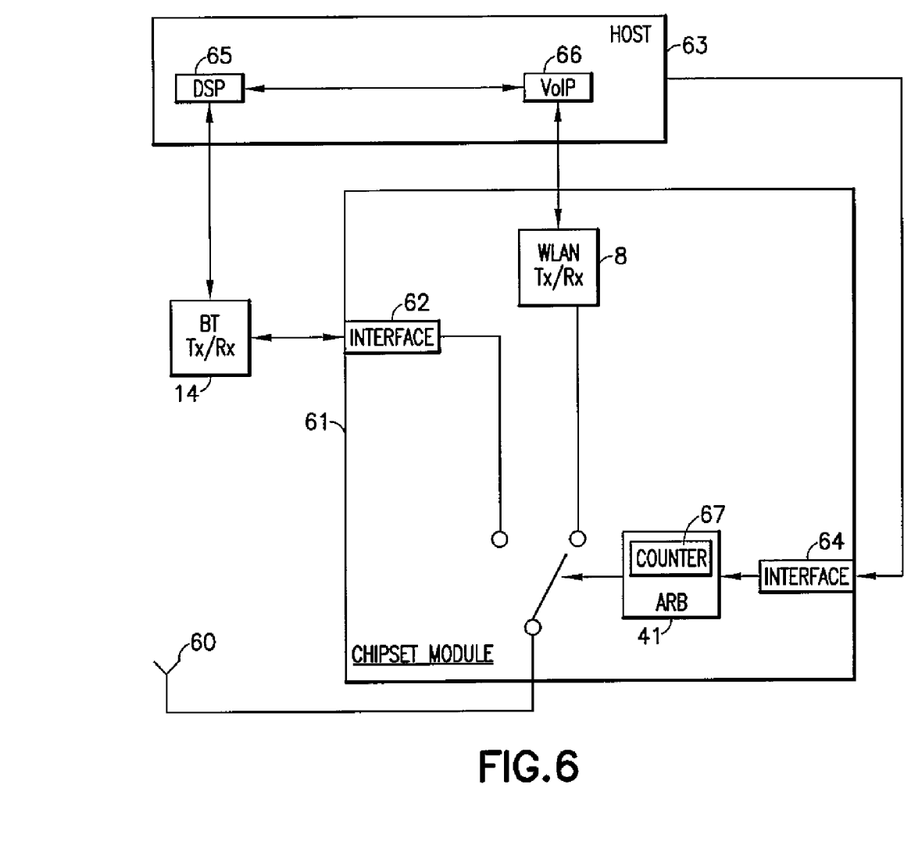
FIG. 6 schematically illustrates the apparatus in more detail.

FIG. 6 schematically illustrates one possible example configuration of the apparatus 40.

In this example, the arbitrator 41 is part of a WLAN chipset module 61 which also comprises the WLAN node 8. As used here 'module' refers to a unit or apparatus that excludes certain parts/components that would be added by an end manufacturer or a user.

The arbitrator controls access to an antenna 60 shared by the WLAN node 8 and the Bluetooth transceiver device 14.

The Bluetooth transceiver device 14 communicates with the WLAN chipset module 61 via a first interface 62 and a host system 63 communicates with the WLAN chipset module 61 via a second interface 64.

The host system 63 includes digital signal processing (DSP) circuitry 65 which communicates with the Bluetooth transceiver device 14 and voice over Internet Protocol chipset 66 for communicating with the WLAN node 8.

Figure 7:
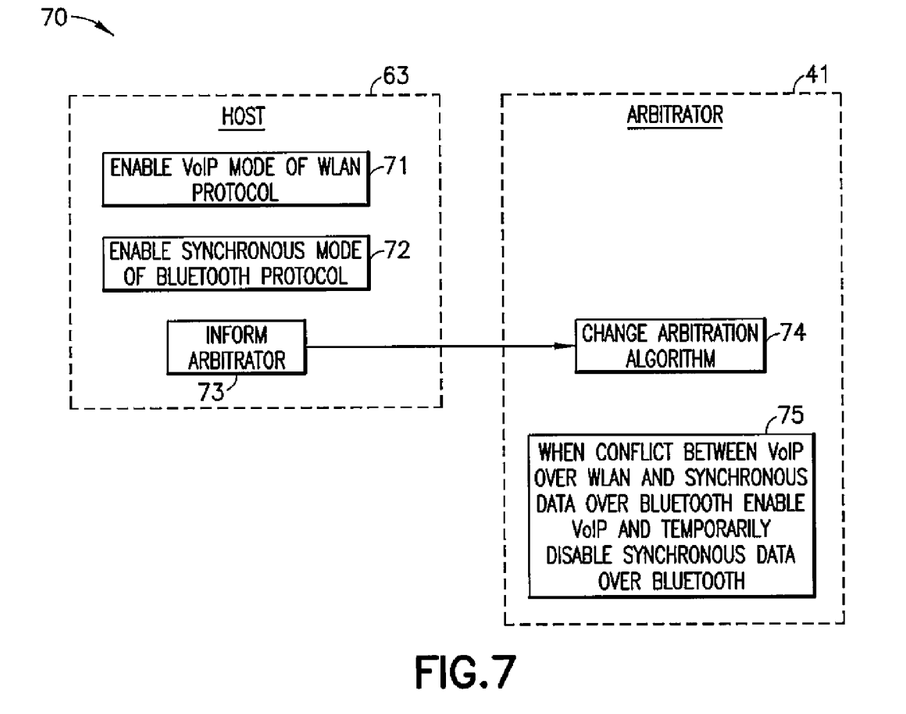
FIG. 7 schematically illustrates a method performed by the apparatus.

The operation of the apparatus 40 is as described with reference to FIG. 4. Referring to FIG. 7 which schematically illustrates a method 70 performed by the apparatus 40, the host system 63 at block 71 enables a VoIP mode using the VoIP mode chipset 66. The VoIP chipset is configured to periodically send VoIP packets to the WLAN node 8 for transmission as WLAN packets 7.

The host system 63 at block 72 enables a Bluetooth synchronous data mode. The DSP 65 is configured to periodically send synchronous data to the Bluetooth transceiver device 14 for transmission as synchronous data packets 16.

The order of blocks 71 and 72 may be interchanged.

The host system 63 at block 73 informs the arbitrator 41 via the second interface 64 that the VoIP mode and the synchronous data mode are concurrently active. The host system 63 may also inform the arbitrator 41 of the interval between periodic VoIP packets.

The arbitrator 41 at block 74 in response to being informed that the VoIP mode and the synchronous data mode are concurrently active, changes the algorithm it uses for arbitrating access to the shared antenna 60.

The new algorithm is performed at block 75. The algorithm, gives priority to the WLAN node 8 over the Bluetooth transceiver device 14 whenever there is a conflict between the VoIP mode and the synchronous data mode. When a transmission is required for the VoIP mode at the same time as a transmission is required for the synchronous data mode, then the transmission for the VoIP mode occurs but the transmission for the synchronous data mode does not.

The host system 63 may change the VoIP packet interval in dependence on VoIP packet length/number of users/data rate. For example, for shorter packets (1 user) the 30 ms interval for VoIP may be optimal and the VoIP interval may be increased as VoIP packet size increases. The new interval may be chosen to minimise the effect of conflict between the VoIP mode and the synchronous data mode.

The arbitrator 41 may comprise a programmable counter 67 which is set to the interval of the VoIP packets. The counter 67 counts the interval and whenever the counter expires, access to the shared antenna is granted to the WLAN node.

The arbitrator 41 may comprise a programmable 67 which is set to the WLAN beacon interval of 100 ms. The counter 67 counts the beacon interval and whenever the counter expires, access to the shared antenna is granted to the WLAN node. Different counters may be used for the VoIP packet interval and the beacon interval.

The arbitrator 41 is a controller that controls access to the ISM band. It may be implemented as hardwired circuitry, or as firmware or as software run on a programmable processor. The firmware and software implementations may use a computer program to control a general or application specific processor.

The program may comprise a first set of instructions for performing a first algorithm for dynamically and variably allocating the ISM band to one of a communication by the WLAN node and a simultaneous communication by the Bluetooth transceiver device, an input interface for receiving a first input that identifies scheduling for VoIP via the WLAN node and a second input that identifies scheduling for the Bluetooth synchronous data; and a second set of instructions for performing a second algorithm for allocating the ISM band to a scheduled VoIP packets over WLAN in preference to a scheduled simultaneous synchronous packet over Bluetooth.

The computer program may arrive at the apparatus 40 via an electromagnetic carrier signal or be copied from a physical entity such as a computer program product, a memory device or a record medium such as a CD-ROM or DVD.

Figure 8:
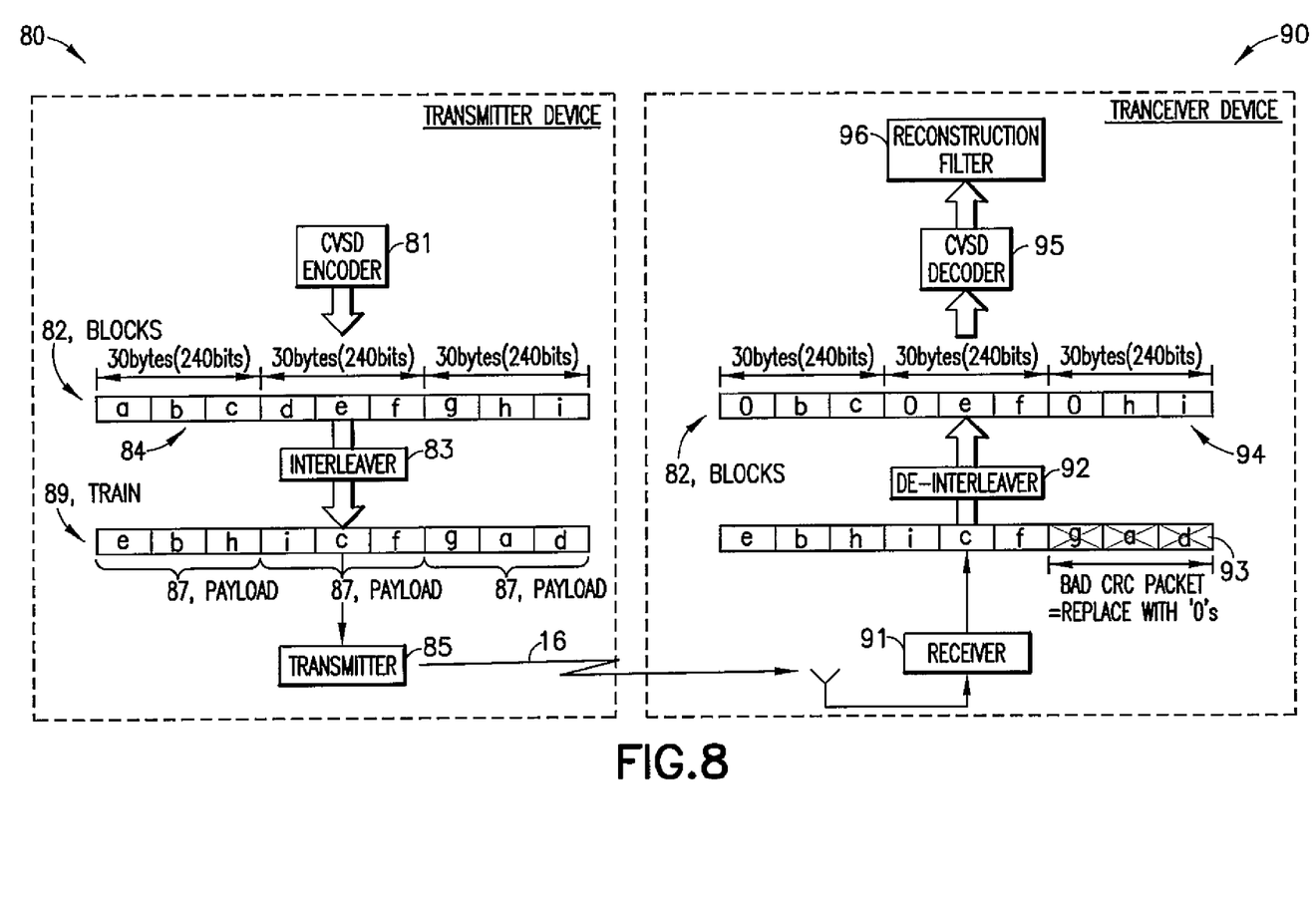
FIG. 8 schematically illustrates processes that may be performed at a transmitting Bluetooth transceiver device and a receiving Bluetooth transceiver device.

Referring to FIG. 8, at a transmitting Bluetooth transceiver device 80, an audio encoder 81 produces an ordered train 84 of audio data which in this example are divided into blocks 82. In this example each of the blocks 82 includes 10 bytes of data.

An interleaver 83 interleaves the blocks 82 to produce a reordered train 89. In this example the interleaving function operates on a train of 90 bytes comprised on nine 10 byte blocks 82 using [5, 2, 8, 9, 3, 6, 7, 1, 4] to re-order the respective blocks. The train 84 comprises a series of three groups of blocks and each group of blocks includes three consecutive blocks. The train 89 also comprises a series of three groups of blocks and each group of blocks includes three consecutive blocks. Each group of blocks in the interleaved train 89 includes a single block from each of the three groups of blocks in the train 84.

Other interleaving functions and block sizes may be used. This interleaving function happens to respect the boundaries of the synchronous data packets 16 because the synchronous data packet payload size is a multiple of the interleaving block size. However, in other implementations a different interleaving block size 82 may be used.

The interleaved blocks of the reordered train 89 will be grouped by a transmitter 85 into payloads 87 for synchronous data packets 16. In the illustrated example the size of three of the interleaved blocks happens to correspond to the size of a payload 87.

The transmitter 85 packages the interleaved blocks into synchronous data packets 16 and transmits the synchronous data packets 16.

Figure 9:
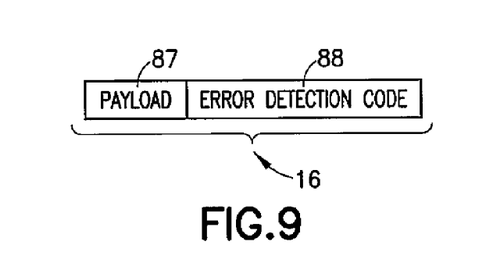
FIG. 9 schematically illustrates a synchronous data packet.

The synchronous data packet 16, as schematically illustrated in FIG. 9, may comprise multiple interleaved blocks in a payload 87 and also comprises an error detection code 88 for the payload 87. In the illustrated example, each payload contains three 10 byte blocks. The error detection code 88 may be a cyclic redundancy check (CRC) code for the payload 87. The synchronous data packet 16 may be a Bluetooth EV3 packet with no retransmission for basic data rate and Bluetooth 2EV3 with no retransmission for enhanced data rate.

At a receiving Bluetooth transceiver device 90, a receiver 91 receives the synchronous data packets 16. The receiver 91 uses the error detection code 88 to identify whether a received packet has been corrupted. If a received synchronous packet 16 is corrupted, the audio data packets 82 in its payload are flagged as corrupt. The corrupt audio data packets are then replaced with replacement data 93. In the illustrated example, the replacement data is '0'. If a scheduled synchronous packet 16 is not received, its payload (typically the next three audio packets) is flagged as corrupt and replacement data is used instead of received data.

The replacement data replaces random noise or absent data with a defined value. The replacement value may, for example, be 0 or a previous good value, or a value interpolated from a previous and a following good packets, or by alternately using one of +1, −1.

A de-interleaver 92 de-interleaves the received audio data packets 82 using the reverse function of that used by interleaver 83 to recover an ordered train 94 of audio data packets 82.

An audio decoder 95 processes the ordered train 94 of audio data packets 82 and its output is filter by reconstruction filter 96.

The audio encoder/decoder pair may be but is not restricted to a continuously variable slope delta (CVSD) encoder/decoder pair which is tolerant to data loss but intolerant of corrupt data The use of an error detection code 88 and data filling using replacement data 93 compensates for unusable synchronous data packets. The use of interleaving and de-interleaving spreads the effect of data filling so that it is less noticeable.

The synchronous data packets 16 are only sent in one reserved TDD frame in every three TDD frames. The spare two unreserved TDD frames may be used for other purposes. For example, when a Bluetooth transceiver device is in a scanning mode, it may respect the reserved TDD frame and use the unreserved TDD frames for scanning such as sending or receiving Inquiry messages. It should therefore be appreciated that the fast frequency hopping sequence used for reserved TDD frames is based upon the network clock whereas the fast frequency hopping sequence used for the unreserved TDD frames is based upon a native clock.

The blocks illustrated in FIG. 7 may represent steps in a method and/or sections of code in a computer program. The illustration of a particular order to the blocks does not necessarily imply that there is a required or preferred order for the blocks and the order and arrangement of the block may be varied.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
    enabling a first mode of a first radio communications protocol using a shared radio frequency band and having a first defined schedule for communication in the shared radio frequency band, wherein the first schedule is periodic and has a first interval between communications;
    enabling a second mode of a second radio communications protocol using the shared radio frequency band and having a second defined schedule for communication in the shared radio frequency band;
    enabling the first mode and disabling the second mode at a conflict time at which the first defined schedule and the second defined schedule coincide; and
    adapting a size of the first interval to reduce the conflict time at which the first defined schedule and the second defined schedule coincide.

2. A method as claimed in claim 1, wherein the first mode and the second mode are real-time data communication modes.

3. A method as claimed in claim 1 wherein the first mode is for voice telephony.

4. A method as claimed in claim 1, wherein the second mode is for synchronous data transport using reserved slots.

5. A method as claimed in claim 1, wherein the first interval is one of 10 ms, 20 ms, 30 ms, 40 ms.

6. A method as claimed in claim 1, wherein first packets are used during the first mode of the first radio communications protocol, the method further comprising adapting a size of the first interval in dependence upon a size of the first packet.

7. A method as claimed in claim 1, wherein the first radio communications protocol supports a number of distinct channels, the method further comprising adapting a size of the first interval in dependence upon the number of distinct channels.

8. A method as claimed in claim 1, wherein the first radio communications protocol supports a number of distinct data rates, the method further comprising adapting a size of the first interval in dependence upon the currently used data rate.

9. A method as claimed in claim 1, wherein the second schedule is periodic and has a second interval between communications.

10. A method as claimed in claim 9, wherein the second interval is 3.75 ms.

11. A method as claimed in claim 1, wherein the second mode of the second radio communications protocol uses a mechanism that compensates for the loss of communication packets.

12. A method as claimed in claim 1, wherein during the second mode of the second radio communications protocol, when a received packet is corrupted replacement data is used.

13. A method as claimed in claim 1, wherein, during the second mode of the second radio communications protocol, data for transmission is reordered by interleaving.

14. A method as claimed in claim 1, comprising:
using a first algorithm to dynamically and variably enable one of a communication according to the first radio communications protocol and a simultaneous communication according to the second radio communications protocol;
detecting when the first mode of the first radio communications protocol and the second mode of the second radio communications protocol are simultaneously active; and
using a second algorithm, instead of the first algorithm, to enable a scheduled communication according to the first mode of the first radio communications protocol and disable a scheduled communication according to the second mode of the second radio communications protocol, whenever the scheduled communication according to the first mode of the first radio communications protocol and the scheduled communication according to the second mode of the second radio communications protocol are simultaneous.

15. A method as claimed in claim 1, further comprising:
enabling at an apparatus a synchronous mode of a radio communications protocol using a frequency hopping sequence determined by a native clock of a Master for slots reserved for periodic synchronous communication; and
simultaneously enabling at the apparatus a scanning mode of the radio communications protocol using a frequency hopping sequence determined by a native clock of the apparatus for slots other than the slots reserved for periodic synchronous communication.

16. A method as claimed in claim 1, further comprising:
enabling at an apparatus a synchronous mode of a radio communications protocol using a frequency hopping sequence determined by a native clock of a Master for slots reserved for periodic synchronous communication; and
transmitting ,a synchronous packet in a reserved slot, wherein the synchronous packet comprises data and an error detection code.

17. A method as claimed in claim 1, wherein the second schedule is periodic and has a second interval between communications, and the first interval is different from the second interval.

18. An apparatus comprising:
a first radio transceiver configured to operate according to a first radio communications protocol that uses a shared radio frequency band;
a second radio transceiver configured to operate according to a second different radio communications protocol that uses the shared radio frequency band; and
a controller configured
to enable radio communications by the first radio transceiver and temporarily disable radio communications by the second transceiver to avoid simultaneous radio communications by the first radio transceiver, when using a first defined schedule for communication in the shared radio frequency band, wherein first packets are used by the first radio communications protocol and the first defined schedule is periodic and has a first interval between communications, and the second radio transceiver, when using a second defined schedule for communication in the shared radio frequency band, and
to adapt a size of the first interval to reduce the conflict time at which the first defined schedule and the second defined schedule coincide.

19. An apparatus as claimed in claim 18, wherein the first defined schedule is for voice telephony between the apparatus and a network access point and the second defined schedule is for synchronous data communication between the apparatus and a user input/output device.

20. An apparatus as claimed in claim 18, wherein the method further comprises adapting a size of the first interval in dependence upon one or more of a size of the first packet, a number of distinct channels in use by the first communications protocol and the data rate in use.

21. A method comprising:
enabling a first mode of a first radio communications protocol using a shared radio frequency band and having a first defined schedule for communication in the shared radio frequency band;
enabling a second mode of a second radio communications protocol using the shared radio frequency band and having a second defined schedule for communication in the shared radio frequency band; and
enabling the first mode and disabling the second mode at a conflict time at which the first defined schedule and the second defined schedule coincide, during the second mode of the second radio communications protocol, data for transmission is reordered by means of interleaving.

* * * * *